United States Patent

Sakai et al.

[11] Patent Number: 6,099,955
[45] Date of Patent: Aug. 8, 2000

[54] URETHANE FOAM FOR SHOE SOLES

[75] Inventors: Mitsuru Sakai; Shoichiro Harada; Kazunari Takemura; Akito Itoi; Makoto Okubo, all of Wakayama, Japan

[73] Assignee: Kao Corporation, Tokyo, Japan

[21] Appl. No.: 09/142,231

[22] PCT Filed: Feb. 28, 1997

[86] PCT No.: PCT/JP97/00632

§ 371 Date: Sep. 3, 1998

§ 102(e) Date: Sep. 3, 1998

[87] PCT Pub. No.: WO97/32923

PCT Pub. Date: Sep. 12, 1997

[30] Foreign Application Priority Data

| Mar. 5, 1996 | [JP] | Japan | ................................. 8-078293 |
| Mar. 5, 1996 | [JP] | Japan | ................................. 8-078294 |
| Mar. 12, 1996 | [JP] | Japan | ................................. 8-084849 |
| Mar. 12, 1996 | [JP] | Japan | ................................. 8-084850 |

[51] Int. Cl.$^7$ ...................................................... B32B 5/32
[52] U.S. Cl. ...................... 428/318.8; 428/213; 428/218; 428/316.6
[58] Field of Search ................................. 428/213, 218, 428/316.6, 318.8

[56] References Cited

U.S. PATENT DOCUMENTS 5,126,181  6/1992  Figuly et al. ........................... 428/64.1

FOREIGN PATENT DOCUMENTS 0072024  2/1983  European Pat. Off. .
0559216  9/1993  European Pat. Off. .

OTHER PUBLICATIONS

WPI Derwent Publications Ltd., London, GB; Class A25, AN 86–343852 (no date).

*Primary Examiner*—Blaine Copenheaver
*Assistant Examiner*—Ula C. Ruddock
*Attorney, Agent, or Firm*—Birch, Stewart, Kolasch & Birch, LLP

[57] ABSTRACT

A urethane foam for shoe soles prepared by reacting a compound having at least two isocyanate-reactive hydrogen atoms and a molecular weight of 400 to 10000 with a polyisocyanate in the presence of a foam stabilizer, water and a catalyst, characterized in that the ratio $r_1/r_2$ of a mean skill cell diameter $r_1$ to a mean core cell diameter $r_2$ is 0.02 to 0.80, wherein the mean skin cell diameter $r_1$ is defined as the mean diameter of the cells which form the skin portion of a urethane foam extending from the surface to a depth of 5% of the foam thickness and the mean core cell diameter $r_2$ is defined as the mean diameter of the cells which form the core portion of a urethane foam extending from a depth of 40% to a depth of 60% of the foam thickness.

16 Claims, 1 Drawing Sheet

URETHANE FOAM FOR SHOE SOLES

This application is the national phase under 35 U.S.C. §371 of prior PCT International Application No. PCT/JP97/04892 which has an International filing date of Dec. 26, 1997 which designated the United States of America, the entire contents of which are hereby incorporated by reference.

TECHNICAL FIELD

The present invention relates to a urethane foam for shoe soles where the sizes of the skin and core cells are markedly different.

BACKGROUND ART

Usually, a polyurethane foam is prepared by mixing and stirring a polyisocyanate and a polyol mixture comprising a polyol, a catalyst, a blowing agent, a foam stabilizer (a surfactant), and other optional auxiliaries, and thereby allowing the components to react.

Shoe soles made of polyurethane foam exhibit excellent properties such as lightness, impact resistance, chemical resistance, abrasion resistance, and bending resistance. With respect to midsoles, in particular, there has recently been a rapid trend toward density reduction for the purposes of reduction in cost and weight. Density reduction in a water-blown polyurethane foam for shoe soles is normally achieved by increasing the relative amount of water in the polyol mixture to increase the generation of $CO_2$ gas for foaming.

However, increasing the relative amount of water as a blowing agent markedly deteriorates the foam's mechanical properties due to increased urea linkage. Deterioration of split tear strength, a particularly important mechanical property of midsoles, is a problem. Although many attempts have been made to improve the split tear strength through investigation of polyols, prepolymers, or catalysts, no useful means to improve the split tear strength has been found.

On the other hand, an integral skin foam method is used to mold automobile interiors without affecting the foam's mechanical properties. It is characterized in that the skin layer and inner foam are simultaneously molded. This can be achieved by suppressing the expansion of the skin portion which comes into contact with the mold's inner wall during the reaction.

However, because the skin layer is a high-density elastomer, reducing the molded density of the foam as a whole is limited. Also, a chlorofluorocarbon-type blowing agent is required for the integral skin method, which causes various problems in a process where water is used as a blowing agent.

Further, EP-A-0559216 discloses a process for producing a polyurethane integral skin foam by using no halogenated hydrocarbon as a blowing agent.

However, this document does not disclose a method for producing a polyurethane foam having a certain cell diameter distribution.

DISCLOSURE OF THE INVENTION

The object of the present invention is to solve the above problems. Accordingly, the present invention provides a polyurethane foam possessing excellent moldability which maintains a high split tear strength even when the relative amount of water is increased to reduce the molded density of the polyurethane foam.

In order to solve the above problem, the present inventors have made intensive studies and found that a polyurethane foam having a certain cell diameter distribution can solve the above problem, and thus have completed the present invention.

Accordingly, the present invention is directed to a urethane foam for shoe soles prepared by reacting a compound having at least two isocyanate-reactive hydrogen atoms and a molecular weight of 400 to 10000 with a polyisocyanate in the presence of a foam stabilizer, water and a catalyst, characterized in that the ratio $r_1/r_2$ of a mean skin cell diameter $r_1$ to a mean core cell diameter $r_2$ is 0.02 to 0.80, wherein the mean skin cell diameter $r_1$ is defined as the mean diameter of the cells which form the skin portion of a urethane foam extending from the surface to a depth of 5% of the foam thickness and the mean core cell diameter $r_2$ is defined as the mean diameter of the cells which form the core portion of a urethane foam extending from a depth of 40% to a depth of 60% of the foam thickness;

BEST MODE FOR CARRYING OUT THE INVENTION

Figure 1:
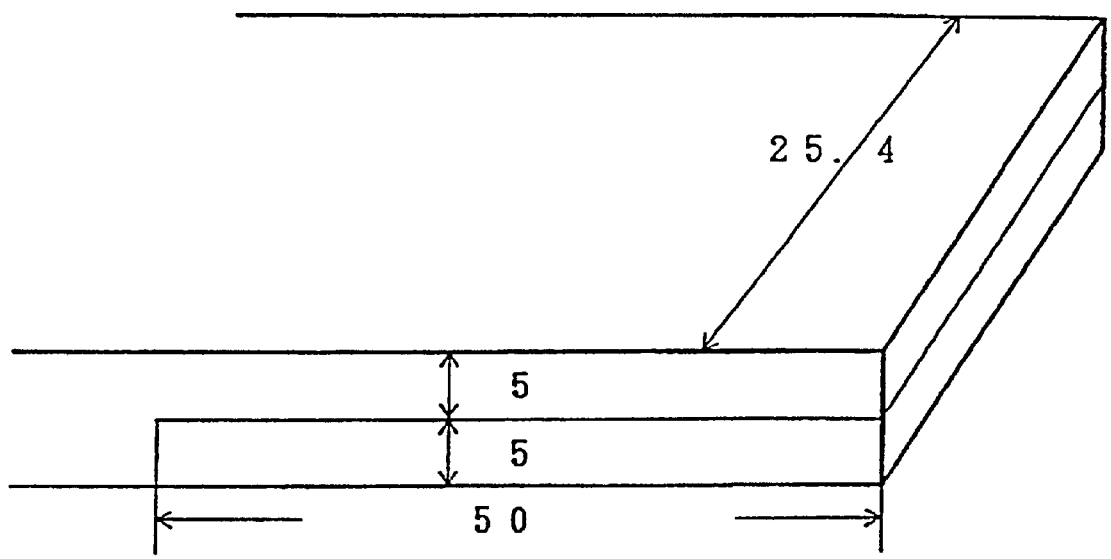
FIG. 1 is a perspective of a polyurethane foam test piece for the determination of split tear value.

The urethane foam for shoe soles of the present invention is obtained by reacting a compound having at least two isocyanate-reactive hydrogen atoms and having a molecular weight of 400 to 10000 (hereinafter referred to as "an isocyanate-reactive compound") and a polyisocyanate in the presence of a foam stabilizer, water and a catalyst, wherein the ratio $r_1/r_2$ of the mean skin cell diameter $r_1$ to the mean core cell diameter $r_2$ is 0.02 to 0.80, preferably 0.02 to 0.60, more preferably 0.02 to 0.40, and still more preferably 0.03 to 0.30.

Here, "the mean skin cell diameter $r_1$" is defined as the mean diameter of the cells which form the skin portion of a urethane foam extending from the surface to a depth of 5% of the foam thickness. On the other hand, "the mean core cell diameter $r_2$" is defined as the mean diameter of the cells which form the core portion of a urethane foam extending from a depth of 40% of the foam thickness to a depth of 60% of the foam thickness. In the case of a urethane foam sheet with a 10-mm thickness, for example, "$r_1$" is obtained with the cells which form the portion of the urethane foam extending from the surface to a depth of 0.5 mm, while "$r_2$" is obtained with the cells which form the portion extending from a depth of 4 mm to a depth of 6 mm of the foam sheet. The mean cell diameters $r_1$ and $r_2$ are obtained by taking a cross-sectional photomicrograph of the urethane foam using a scanning electron microscope (SEM), and calculating number (arithmetic) average of the maximum diameters in a given direction (also referred to as Krummbein diameter as described in "Silikattechik" 20 (6) 189–192 (1969)).

When the ratio of the mean skin cell diameter $r_1$ to the mean core cell diameter $r_2$ ($r_1/r_2$) is less than 0.02, cushion quality, an essential property of foams, may be impaired. When the ratio exceeds 0.80, the foam surface's cosmetic appearance and moldability may be impaired.

Considering the above points, it is desired in the present invention that the mean skin cell diameter ($r_1$) is not more than 0.20 mm, preferably 0.03 to 0.20 mm, more preferably 0.03 to 0.16 mm, particularly preferably 0.03 to 0.12 mm. Also, the mean core cell diameter ($r_2$) is preferably 0.25 to 1.20 mm, more preferably 0.30 to 1.00 mm, still more preferably 0.35 to 0.90 mm. When the mean skin cell diameter $r_1$ exceeds 0.20 mm, smoothness of the foam surface may be impaired. When the mean core cell diameter $r_2$ is less than 0.25 mm, it tends to become difficult to improve the split tear strength. When $r_2$ exceeds 1.20 mm, void may occur, thereby impairing the product quality.

A preferred embodiment is that $r_1/r_2$ is 0.02 to 0.60, wherein $r_2$ is 0.25 to 1.20 mm; a more preferred embodiment is that $r_1/r_2$ is 0.02 to 0.60, wherein $r_2$ is 0.30 to 1.00 mm; and a still more preferred embodiment is that $r_1/r_2$ is 0.02 to 0.40, wherein $r_2$ is 0.30 to 1.00 mm. In a still more preferable embodiment, $r_1/r_2$ is 0.02 to 0.40, wherein $r_2$ is 0.35 to 0.90 mm. In these embodiments, $r_1$ is not particularly limited as long as it is not more than 0.2 mm.

Here, "the mean skin foam density $d_1$" is defined as the mean density of foam in the skin portion extending from the surface to a depth of 12% of the foam thickness, while "the mean core foam density $d_2$" is defined as the mean density of foam in the core portion extending from a depth of 40% of the foam thickness to a depth of 60% of the foam thickness. In the case of a urethane foam sheet with a 10-mm thickness, for example, "the mean skin foam density $d_1$" is obtained with the foam portion extending from the surface to a depth of 1.2 mm, while "the mean core foam density $d_2$" is obtained with the foam portion extending from a depth of 4 mm to a depth of 6 mm. Also, the mean foam densities $d_1$ and $d_2$ are obtained by cutting pieces of a given size from the skin and core portions of the foam and weighing the pieces. The ratio $d_2/d_1$ of the mean core foam density $d_2$ to the mean skin foam density $d_1$ is preferably 0.2 to 0.8, more preferably 0.3 to 0.7.

The overall molded density of the urethane foam for shoe soles of the present invention is 0.15 to 0.50 g/cm$^3$, preferably 0.20 to 0.40 g/cm$^3$, more preferably 0.20 to 0.35 g/cm$^3$, most preferably 0.20 to 0.32 g/cm$^3$. When the overall molded density is less than 0.15 g/cm$^3$, the strength of the, foam may become too weak for shoe sole application. When the overall molded density exceeds 0.50 g/cm$^3$, the entire foam becomes in the state of elastomer, thereby making it difficult to adjust the ratio of cell diameters.

Considering the relation between the overall molded density and tensile strength, it is preferred that the overall molded density is 0.15 to 0.50 g/cm$^3$, while the tensile strength is not less than 20 kg/cm$^2$ and more preferred that the overall molded density is 0.20 to 0.40 g/cm$^3$ while the tensile strength is not less than 20 kg/cm$^2$. It is further more preferred that the overall molded density is 0.20 to 0.35 g/cm$^3$, while the tensile strength is not less than 20 kg/cm$^2$. It is still more preferred that the overall molded density is 0.20 to 0.32 g/cm$^3$, while the tensile strength is not less than 24 kg/cm$^2$. Here, the tensile strength is determined one or more days after the molding when the tensile strength of a test sample has become stable. Incidentally, the tensile strength soon after demolding is preferably not less than 4 kg/cm$^2$, more preferably not less than 6 kg/cm$^2$.

Considering the above points, it is desired in the present invention that the mean skin foam density ($d_1$) is 0.20 to 0.80 g/cm$^3$, particularly 0.25 to 0.70 g/cm$^3$, while the mean core foam density ($d_2$) is 0.05 to 0.60 g/cm$^3$, particularly 0.12 to 0.50 g/cm$^3$.

Also, in view of the fact that foam shrinkage tends to occur at low density, it is desired in the present invention that the cells be open cells.

Any method can be used without limitation to prepare a urethane foam having a particular cell diameter and density for the present invention, and such a urethane foam can be obtained by optimizing molding conditions, such as mold temperature and mixer stirring rate, and choosing and controlling catalysts and/or foam stabilizers.

For example, as foam stabilizers, (A) a polyalkylsiloxane and (B) a polysiloxane-polyoxyalkylene copolymer may be combinedly used.

Examples of polyalkylsiloxanes for the present invention include polydimethylsiloxanes and polymethylphenylsiloxanes, with preference given to the polydimethylsiloxanes represented by formula (1) below. Of the polydimethylsiloxane compounds represented by the formula, those wherein X4 is 0 to 20 are particularly preferred.

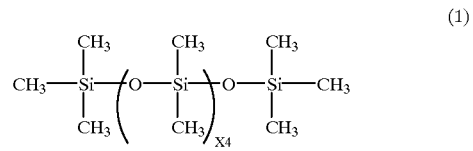

(1)

(In the formula, X4 is a number of 0 to 48.)

The above-described polyalkylsiloxanes are commercially available.

Also, as a foam stabilizer, any polysiloxane-polyoxyalkylene copolymer can be used for the present invention, as long as it is normally used as a foam stabilizer for urethane foam production. Examples of such polysiloxane-polyoxyalkylene copolymers include copolymers mainly comprising one or more polysiloxane components, such as polydimethylsiloxane and polymethylphenylsiloxane, and one or more polyoxyalkylene components, such as polyoxyethylene and polyoxypropylene. Here, the components of such copolymers may be polymerized by block polymerization, random polymerization and other methods, with preference given to block polymerization.

Among the above, one or more copolymers represented by formulas (2) through (4) below are preferably used.

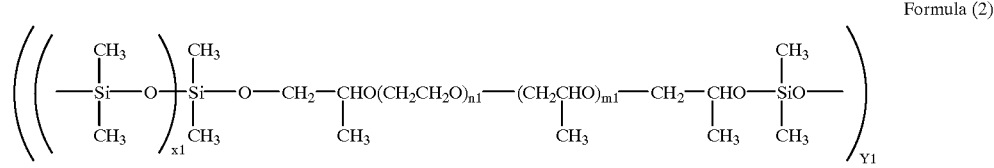

Formula (2)

(In the formula, X1 is a number of 40 to 60; Y1 is a number of 5 to 10; m1 is a number of 5 to 15; and n1 is a number of 10 to 20.)

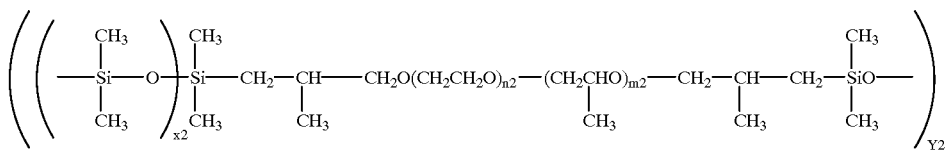

Formula (3)

(In the formula, X2 is a number of 40 to 60; Y2 is a number of 5 to 15; m2 is a number of 4 to 10; and n2 is a number of 10 to 20.)

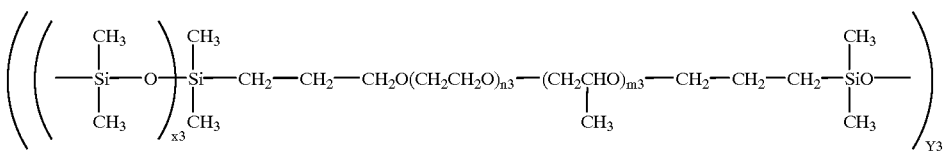

Formula (4)

(In the formula, X3 is a number of 40 to 60; Y3 is a number of 5 to 10; m3 is a number of 5 to 15; and n3 is a number of 5 to 15.)

The above-described polysiloxane-polyoxyalkylene copolymers are commercially available and they can easily be synthesized, for example, by the method described in Japanese Patent Laid-Open No. 7/90102.

When the above-described foam stabilizers are used in combination, the ratio by weight B/A of polysiloxane-polyoxyalkylene copolymer (B) to polyalkylsiloxane (A) is preferably 0.02 to 1.00, more preferably 0.02 to 0.50. When the ratio by weight B/A is less than 0.02, demold time tends to be extended, when it exceeds 1.00, the foam surface tends to become rough.

The total amount of these foam stabilizers used is preferably 0.2 to 3.0 parts by weight, more preferably 0.5 to 2.0 parts by weight, based on 100 parts by weight of isocyanate-reactive compound. If the amount is less than 0.2 parts by weight, the foam-stabilizing power for cell shape control is insufficient; if it exceeds 3.0 parts by weight, the foam strength tends to be decreased by plasticizing action.

In addition to the above foam stabilizers, such foam stabilizers as fluorine-based foam stabilizers and ordinary silicone- or fluorine-free surfactants may be optionally used. The amount of such foam stabilizer used is preferably 0.2 to 3.0 parts by weight based on 100 parts by weight of isocyanate-reactive compound.

Mold temperature is normally 40 to 60° C.

Isocyanate-reactive compounds which can be used for the present invention, i.e., compounds having at least two isocyanate-reactive hydrogen atoms in the molecule, include polyester polyols, polyether polyols and polymer polyols having a molecular weight of 400 to 10000, preferably 1000 to 3000.

Examples of such polyester polyols include condensation polymers formed between polyhydric alcohols, such as ethylene glycol, propylene glycol, 1,4-butanediol, diethylene glycol, neopentyl glycol and trimethylolpropane, and polybasic acids, such as phthalic acid, maleic acid, malonic acid, succinic acid, adipic acid and terephthalic acid, and having a hydroxyl group at its terminus.

Useful polyether polyols include polyether polyols and polytetramethylene ether glycols obtained by addition polymerization of alkylene oxides to polyhydric alcohols, such as ethylene glycol, propylene glycol, 1,4-butanediol, neopentyl glycol, 1,6-hexanediol, glycerol, trimethylolpropane, 1,2,6-hexanetriol and pentaerythritol.

In carrying out the present invention, a polyhydroxy compound having a molecular weight of not less than 32 and less than 400 may be used as an ordinary chain extender and crosslinking agent according to necessity. By the use of such a polyhydroxy compound, the properties of the polyurethane foam for shoe soles obtained can optionally be changed.

Examples of polyisocyanates for the present invention include tolylene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl isocyanate, 3,3'-dimethyl-4,4'-diphenylmethane diisocyanate, 3,3'-dimethyl-4,4'-biphenylene diisocyanate, 3,3'-dichloro-4,4'-biphenylene diisocyanate, 4,4'-biphenylene diisocyanate, 1,5-naphthalene diisocyanate compounds, or mixtures thereof, modified products thereof, or prepolymers thereof. Among them, toluene diisocyanate, 4,4'-diphenylmethane diisocyanate, or mixtures thereof, modified products thereof, or prepolymers thereof are preferably used.

The prepolymers are polymers having active isocyanate groups at its ends prepared by previously reacting an excess of polyisocyanate with polyols such as polyester polyol and polyether polyol. The prepolymers are used as a precursor for the production of a polyurethane.

The amount of polyisocyanate used is normally 50 to 150 parts by weight, preferably 60 to 140 parts by weight based on 100 parts by weight of isocyanate-reactive compound.

In producing a urethane foam for shoe soles, a blowing agent is used. The preferred blowing agent for the present invention is water, which generates carbon dioxide upon reaction with polyisocyanate. In the present invention, it is desired, from the viewpoint of density reduction of the polyurethane foam obtained, that the amount of water used be 0.4 to 2.0 parts by weight, more preferably 0.8 to 1.8 parts by weight, based on 100 parts by weight of isocyanate-reactive compound.

Any catalyst can be used for the present invention, as long as it is normally used as a catalyst for urethane foam production. For example, amine catalysts, such as triethylenediamine, and 1,2-dimethylimidazole are preferably used, and 1,2-dimethylimidazole and an amine catalyst may be used in combination. The amount of catalyst used is normally 0.1 to 3 parts by weight, preferably 0.1 to 2.0 parts by weight, based on 100 parts by weight of isocyanate-reactive compound.

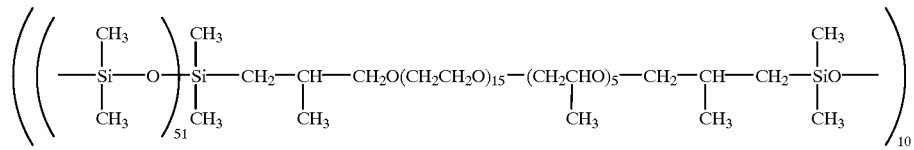

In addition to the above-described components, components such as anti-discoloration agents, stabilizers, and anti-fungal agents may be optionally used in the present invention.

In most cases, a urethane foam is prepared by a known one-shot method utilizing a prepolymer or a semi-prepolymer.

According to the present invention, it is also possible to carry out the mixing in a closed mold to produce a foam. For this purpose, the reaction mixture is injected into a mold. Examples of suitable mold materials include metals, such as aluminum, and plastic materials, such as epoxy resin. The expandable reaction mixture forms a foam in the mold. Blowing in the mold is conducted so that the resulting foam has a cell structure on the surface thereof, and may also be conducted so that the foam has a high-density crust and a spongy core. In this regard, the present invention allows the expandable reaction mixture to be introduced into the mold in an amount such that the resulting foam just fills the mold. However, the expandable reaction mixture can also be introduced into the mold in an amount exceeding the minimum amount required to fill the mold with the resulting foam.

In many cases, any known silicone-based release agent is used to ensure desired blowing in the mold.

The present invention is hereinafter described in more detail by means of the following working examples, which are not to be construed as limitative.

SYNTHESIS EXAMPLE

To a 1 liter four-necked flask equipped with a mechanical stirrer, thermometer, refluxing condenser and nitrogen inlet, 170 g of a polyether represented by the formula:

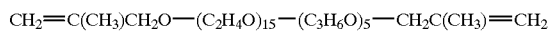

wherein the molar number of the oxyalkylene adduct is shown in mean value, 400 g of toluene and 0.15 g of a 10% solution of $H_2PtCl_6 \cdot 6H_2O$ (solvent: isopropanol) were placed. Next, 199 g of a polydimethylsiloxane represented by the formula:

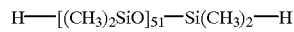

wherein the molar number of the dimethylsiloxane adduct is shown in mean value was added drop by drop, while the reaction temperature was kept at 85 to 100° C. Then, reaction was carried out at 100 to 105° C. for 5 hours. The reaction mixture was then neutralized with sodium hydrogen carbonate and filtered. Subsequently, the toluene was removed at 80° C. and 20 mmHg to yield 320 g of a polysiloxane-polyoxyalkylene block copolymer having a molecular weight of about 50000 and represented by the formula:

wherein the molar numbers of the oxyalkylene and dimethylsiloxane adducts are shown in mean value.

EXAMPLES 1 THROUGH 15

The starting components for polyurethane foam production were mixed according to the formulas in Tables 1 and 2. The polyester polyols used (ethyleneglycol-diethyleneglycol adipate) were that with OHV=52 and MW=2160, that with OHV=86 and MW=1300, and that with OHV=75 and MW=1500. Here, OHV means Hydroxyl Value. The foam stabilizers used were a polyalkylsiloxane mixture represented by the following formula:

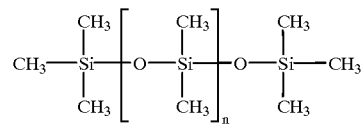

n=0 or 1 and the EO·PO linear block modified silicone obtained in the Synthesis Example, which were used in a 90/10 ratio by weight. The prepolymer used was EDDYFOAM B-2009 (manufactured by Kao Corporation, prepolymer of polyester polyol and 4,4-diphenylmethane diisocyanate, NCO= 18.5%).

Using the MU-203S molding machine (manufactured by Polyurethane Engineering K.K.), the above starting components were reacted to yield a 200×150×10 mm polyurethane foam sheet. All the products obtained in Examples 1 through 15 had a open cell structure.

The molding conditions used are as follows:

Mold Temperature: 50±2° C.

Polyol Mixture and Prepolymer Retention Temperature: 40±2° C.

Demold Time: 5 Minutes

The urethane foam obtained in each example was evaluated as follows:

Mean Cell Diameter ($r_1$, $r_2$):

The mean cell diameters $r_1$ and $r_2$ are obtained by taking a cross-sectional photomicrograph of the urethane foam using a scanning electron microscope (SEM), and calculating number (arithmetic) average diameters using the value of maximum diameter in a given direction (also referred to as Krummbein diameter as described in "Silikattechik" 20 (6) 189–192 (1969)).

Mean Foam Density ($d_1$, $d_2$):

Using a splitting machine (LEATHER SPLITTING MACHINE MOD-443M, manufactured by OMSA Company, Italy), a 70×30×1.2 mm foam section (for skin foam density) and a 70×30×2.0 mm foam section (for core foam density) were prepared from the relevant portions of a foam, respectively, and their $d_1$ and $d_2$ values were determined.

Overall Molded Density:

A 200×150×10 mm polyurethane foam sheet was weighed, and the weight obtained was divided by a volume of: 300 cm$^3$ to obtain overall molded density.

Split Tear Strength:

Split tear value was determined in accordance with the method of ASTM D-3574. Specifically, a 25.4×150×10 mm test piece was cut out from a 200×150×10 mm sheet and horizontally cut over a distance of 50 mm at a 5 mm depth from the surface (see FIG. 1). Using the autograph DCS-50M (manufactured by Shimadzu Corporation), the split tear value was determined at a speed of 50 mm/min, and the actual measurement was divided by 2.54 to obtain the split tear value.

Moldability:

Moldability was evaluated by visually assessing the sheet surface voids, skin condition, bubble size, and shrinkage, using a 3-grade rating system: good (o), single defect (Δ), and two or more defects (x).

The results obtained are shown in Tables 3 and 4.

COMPARATIVE EXAMPLES 1 and 2

The starting components for preparing a polyurethane foam were mixed according to the formulas shown in Table 2. The polyester polyol with OHV=75 and MW=1500 was used. The foam stabilizers used were commercially available side chain EO·PO modified silicone (Comparative Example 1) and the EO·PO linear block modified silicone obtained in Synthesis Example (Comparative Example 2), and each of the stabilizers above was used singly. The prepolymer used was EDDYFOAM B-2009 (manufactured by Kao Corporation), which was the same kind as that used in the above Examples.

The molding and evaluation conditions used were the same as those used in Examples 1 through 15. The results are shown in Table 4.

As shown in Tables 3 and 4, the urethane foam for shoei soles of the present invention has good moldability and a high split tear value. In contrast, the urethane foam obtained in Comparative Example 1, having an $r_1/r_2$ ratio exceeding 0.80 and a low $r_2$ value, had poor moldability and a low split tear value for the molded density. Also, the urethane foam obtained in Comparative Example 2, having an $r_1/r_2$ ratio lower than 0.02, had poor moldability.

TABLE 1

|  |  | A (parts by weight) | | | | | | Amount of A expressed in parts by weight based on 100 parts by weight of B-2009 |
| --- | --- | --- | --- | --- | --- | --- | --- | --- |
|  |  | Polyester polyol | | Ethylene glycol | Triethylene-diamine | Water | Foam stabilizer |  |
|  |  | OHV = 52 | OHV = 86 |  |  |  |  |  |
| Example | 1 | 100 | 0 | 6 | 0.45 | 1.0 | 0.5 | 120 |
|  | 2 | 100 | 0 | 6 | 0.45 | 1.15 | 1.0 | 107 |
|  | 3 | 60 | 40 | 6 | 0.45 | 1.15 | 1.0 | 98 |
|  | 4 | 100 | 0 | 6 | 0.45 | 1.35 | 1.0 | 88 |
|  | 5 | 100 | 0 | 6 | 0.60 | 1.15 | 1.0 | 106 |
|  | 6 | 50 | 50 | 11 | 0.40 | 1.6 | 1.0 | 75 |
|  | 7 | 50 | 50 | 6.0 | 0.45 | 0.8 | 1.0 | 110 |
|  | 8 | 50 | 50 | 4.5 | 0.45 | 0.60 | 1.0 | 112 |
|  | 9 | 100 | 0 | 8 | 0.45 | 1.15 | 1.0 | 103 |
|  | 10 | 50 | 50 | 8 | 0.45 | 1.5 | 1.0 | 85 |

TABLE 2

| | | A (parts by weight) | | | | | Amount of A expressed in parts by weight based on 100 parts by weight of B-2009 |
|---|---|---|---|---|---|---|---|
| | | Polyester polyol | Ethylene | Triethylene- | | Foam | |
| | | OHV = 52 | OHV = 75 | glycol | diamine | Water | stabilizer | |
| Example | 11 | 100 | 0 | 6 | 0.45 | 1.0 | 0.25 | 120 |
| | 12 | 100 | 0 | 6 | 0.45 | 1.0 | 1.0 | 119 |
| | 13 | 100 | 0 | 6 | 0.45 | 1.0 | 2.0 | 118 |
| | 14 | 100 | 0 | 6 | 0.45 | 1.15 | 0.5 | 108 |
| | 15 | 0 | 100 | 6 | 0.45 | 0.8 | 0.5 | 108 |
| Comparative Example 1 | | 0 | 100 | 4.5 | 0.45 | 0.4 | 1.0 | 117 |
| Comparative Example 2 | | 0 | 100 | 8 | 0.60 | 2.50 | 1.0 | 65 |

TABLE 3

| | | Mean cell diameter (mm) | | | Local molded density (g/cm$^3$) | | | Overall molded density (g/cm$^3$) | Split tear (kg/cm) | Moldability |
|---|---|---|---|---|---|---|---|---|---|---|
| | | $r_1/r_2$ | Skin $r_1$ | Core $r_2$ | $d_2/d_1$ | Skin $d_1$ | Core $d_2$ | | | |
| Example | 1 | 0.30 | 0.10 | 0.33 | 0.53 | 0.53 | 0.28 | 0.36 | 3.1 | ○ |
| | 2 | 0.18 | 0.09 | 0.51 | 0.57 | 0.42 | 0.24 | 0.32 | 3.4 | ○ |
| | 3 | 0.15 | 0.08 | 0.53 | 0.52 | 0.44 | 0.23 | 0.32 | 3.6 | ○ |
| | 4 | 0.19 | 0.11 | 0.57 | 0.43 | 0.46 | 0.20 | 0.32 | 3.8 | ○ |
| | 5 | 0.16 | 0.08 | 0.49 | 0.59 | 0.41 | 0.24 | 0.32 | 3.4 | ○ |
| | 6 | 0.16 | 0.10 | 0.61 | 0.47 | 0.36 | 0.17 | 0.25 | 3.9 | ○ |
| | 7 | 0.07 | 0.03 | 0.46 | 0.66 | 0.58 | 0.38 | 0.45 | 5.1 | ○ |
| | 8 | 0.08 | 0.03 | 0.38 | 0.75 | 0.60 | 0.45 | 0.50 | 6.1 | ○ |
| | 9 | 0.22 | 0.10 | 0.45 | 0.61 | 0.41 | 0.25 | 0.32 | 3.2 | ○ |
| | 10 | 0.25 | 0.15 | 0.60 | 0.53 | 0.32 | 0.17 | 0.25 | 3.8 | ○ |

TABLE 4

| | | Mean cell diameter (mm) | | | Local molded density (g/cm$^3$) | | | Overall molded density (g/cm$^3$) | Split tear (kg/cm) | Moldability |
|---|---|---|---|---|---|---|---|---|---|---|
| | | $r_1/r_2$ | Skin $r_1$ | Core $r_2$ | $d_2/d_1$ | Skin $d_1$ | Core $d_2$ | | | |
| Example | 11 | 0.73 | 0.19 | 0.26 | 0.56 | 0.52 | 0.29 | 0.36 | 2.9 | ○ |
| | 12 | 0.21 | 0.08 | 0.39 | 0.50 | 0.54 | 0.27 | 0.36 | 3.4 | ○ |
| | 13 | 0.20 | 0.17 | 0.85 | 0.48 | 0.54 | 0.26 | 0.36 | 5.5 | ○ |
| | 14 | 0.43 | 0.12 | 0.28 | 0.59 | 0.41 | 0.24 | 0.32 | 2.9 | ○ |
| | 15 | 0.42 | 0.11 | 0.26 | 0.70 | 0.56 | 0.39 | 0.45 | 4.1 | ○ |
| Comparative Example | 1 | 0.90 | 0.18 | 0.20 | 0.85 | 0.55 | 0.47 | 0.50 | 3.2 | Δ |
| | 2 | 0.019 | 0.01 | 0.52 | 0.44 | 0.34 | 0.15 | 0.25 | 3.3 | X |

EXAMPLES 16 AND 17

A polyurethane foam was prepared by mixing the starting components according to the formulas in Table 5. The above mentioned EDDYFOAM B-2009 was used as prepolymer.

The molding and evaluation conditions were the same as those used in Examples 1 to 15. The results are shown in Table 6.

TABLE 5

| | | A (parts by weight) | | | | | Amount of A |
|---|---|---|---|---|---|---|---|
| | | Polyester polyol | | | | | |
| | | OHV = 52 MW = 2160 | OHV = 56 MW = 1600 containing 20% of polystyrene | Ethylene glycol | Triethylene-diamine | Water | expressed in parts by weight based on 100 parts by weight of B-2009 |
| Example | 16 | 99.5 | 0.5 | 9.5 | 0.45 | 1.0 | 99 |
| | 17 | 95 | 5 | 8.5 | 0.45 | 1.3 | 88 |

TABLE 6

| | | Mean cell diameter (mm) | | | Local molded density (g/cm³) | | | Overall molded density (g/cm³) | Split tear (kg/cm) | Moldability |
|---|---|---|---|---|---|---|---|---|---|---|
| | | $r_1/r_2$ | Skin $r_1$ | Core $r_2$ | $d_2/d_1$ | Skin $d_1$ | Core $d_2$ | | | |
| Example | 16 | 0.26 | 0.11 | 0.43 | 0.55 | 0.49 | 0.27 | 0.36 | 3.5 | ○ |
| | 17 | 0.20 | 0.10 | 0.50 | 0.46 | 0.46 | 0.21 | 0.30 | 4.2 | ○ |

EXAMPLES 18 TO 21

Using a polyether polyol as the starting material for polyols, a polyurethane foam was prepared under the same conditions as in Examples 1 to 15 according to the formulas shown in Table 7. The same foam stabilizer as that used in Examples 1 to 15 was used. EDDYFOAM B-6106M (manufactured by Kao Corporation, a prepolymer formed between a polyether polyol and 4,4-diphenylmethane diisocyanate, NCO=16%) was used as a prepolymer.

The molding and evaluation conditions were the same; those in Examples 1 to 15. The results are shown in Table 8.

COMPARATIVE EXAMPLES 3 AND 4

A polyurethane foam was prepared according to the formulas shown in Table 7. The foam stabilizer used was the side chain EO·PO modified silicone. The prepolymer used was EDDYFOAM B-6106M manufactured by Kao Corporation, which was the same prepolymer as used in Examples 18 to 21.

The molding and evaluation conditions were the same as those in Examples 1 to 15. The results are shown in Table 8.

As shown in Table 8, the urethane foam for shoe soles of the present invention has a good moldability and a high split tear value. In contrast, the urethane foam obtained in Comparative Examples 3 and 4, having an $r_1/r_2$ ratio exceeding 0.80, had a low split tear value.

TABLE 7

| | | A (parts by weight) | | | | | | | Amount of A expressed in parts by weight based on 100 parts by weight of B-6106M |
|---|---|---|---|---|---|---|---|---|---|
| | | Polyether polyol | | | | | | | |
| | | OHV | Mean functionality | Parts by weight | Ethylene glycol | Triethylene-diamine | Water | Foam stabilizer | |
| Example | 18 | 28 | 2.7 | 100 | 8 | 0.6 | 1.2 | 1.0 | 135 |
| | 19 | 28 | 2.7 | 100 | 6 | 0.6 | 0.9 | 1.0 | 143 |
| | 20 | 37 | 3 | 100 | 6 | 0.6 | 0.9 | 1.5 | 140 |
| | 21 | 56 | 2 | 100 | 5 | 0.6 | 1.0 | 1.0 | 133 |
| Comparative Example | 3 | 28 | 2.7 | 100 | 8 | 0.6 | 1.2 | 1.0 | 135 |
| | 4 | 28 | 2.7 | 100 | 6 | 0.6 | 0.9 | 0.5 | 143 |

TABLE 8

|  |  | Mean cell diameter (mm) | | | Local molded density (g/cm³) | | | Overall molded density (g/cm³) | Split tear (kg/cm) | Moldability |
| --- | --- | --- | --- | --- | --- | --- | --- | --- | --- | --- |
|  |  | $r_1/r_2$ | Skin $r_1$ | Core $r_2$ | $d_2/d_1$ | Skin $d_1$ | Core $d_2$ |  |  |  |
| Example | 18 | 0.36 | 0.14 | 0.39 | 0.55 | 0.40 | 0.22 | 0.3 | 3.0 | ○ |
|  | 19 | 0.34 | 0.11 | 0.32 | 0.65 | 0.49 | 0.32 | 0.4 | 3.1 | ○ |
|  | 20 | 0.20 | 0.09 | 0.45 | 0.69 | 0.48 | 0.33 | 0.4 | 4.3 | ○ |
|  | 21 | 0.21 | 0.08 | 0.38 | 0.55 | 0.51 | 0.28 | 0.4 | 3.7 | ○ |
| Comparative | 3 | 0.82 | 0.18 | 0.22 | 0.55 | 0.38 | 0.21 | 0.3 | 2.0 | Δ |
| Example | 4 | 0.82 | 0.14 | 0.17 | 0.74 | 0.46 | 0.34 | 0.4 | 2.2 | ○ |

EXAMPLES 22 TO 29

Using the MU-203S molding machine (manufactured by Polyurethane Engineering K.K.), the starting components were mixed according to the formulas in Table 9 to yield a 200×150×10 mm polyurethane foam sheet.

The molding conditions used are as follows:
Mold Temperature: 50±2° C.
Polyol Mixture and Prepolymer Retention Temperature: 40±2° C.
Demold Time: 7 Minutes The tensile strength soon after demolding was determined with an apparatus for the Schopper tensile test. The other evaluation conditions were the same as those used in Examples 1 to 15.

The results of the above evaluations are shown in Tables 10 and 11.

In the tables, foam stabilizer A is a mixture of polyalkylsiloxanes represented by the following formula:

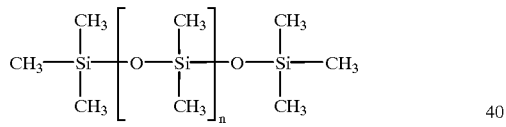

n=0 or 1 and foam stabilizer B is a copolymer prepared in Synthesis Example.

As shown in Tables 10 and 11, the urethane foam for shoe soles obtained by the present invention has a good moldability. Also, the tensile strength soon after demolding is large.

TABLE 9

| Components | | Examples 22–26 (parts by weight) | Examples 27–28 (parts by weight) | Example 29 (parts by weight) |
| --- | --- | --- | --- | --- |
| a | Polyester polyol OHV = 52, MW = 2160 | 50.0 | 60.0 | 20.0 |
|  | Polyester polyol OHV = 86, MW = 1300 | 50.0 | 40.0 | 80.0 |
|  | Ethylene glycol | 11.0 | 6.0 | 4.5 |
|  | Water | 1.6 | 1.15 | 0.65 |
| b | Commercial prepolymer B-2009 (Kao Corp.) (Prepolymer formed between polyester and 4,4-diphenylmethane diisocyanate NCO = 18.5%) | a/b = 70~75/100 | a/b = 95~100/100 | a/b = 105~110/100 |

TABLE 10

| | | Foam stabilizer (parts by weight) | | | Catalyst (parts by weight) | | Molded density ($kg/cm^3$) | Tensile strength soon after demolding ($kg/cm^2$) | Split tear ($kg/cm$) | Moldability |
|---|---|---|---|---|---|---|---|---|---|---|
| | | A | B | B/A | Triethylene-diamine | 1,2-Dimethyl-imidazole | | | | |
| Example | 22 | 0.975 | 0.025 | 0.03 | 0.45 | 0 | 0.25 | 6.0 | 3.1 | ○ |
| | 23 | 0.95 | 0.05 | 0.05 | 0.45 | 0 | 0.25 | 7.2 | 3.6 | ○ |
| | 24 | 0.90 | 0.10 | 0.11 | 0.45 | 0 | 0.25 | 7.4 | 4.2 | ○ |
| | 25 | 0.75 | 0.25 | 0.33 | 0.45 | 0 | 0.25 | 7.8 | 4.0 | ○ |
| | 26 | 0.60 | 0.40 | 0.67 | 0.45 | 0 | 0.25 | 7.5 | 3.9 | ○ |
| | 27 | 0.90 | 0.10 | 0.11 | 0.45 | 0 | 0.30 | 10.7 | 4.4 | ○ |
| | 28 | 0.90 | 0.10 | 0.11 | 0 | 1.5 | 0.30 | 10.3 | 4.8 | ○ |
| | 29 | 0.90 | 0.10 | 0.11 | 0.25 | 1.0 | 0.50 | 21.5 | 6.5 | ○ |

TABLE 11

| Example | $r_1/r_2$ | Mean cell diameter (mm) | | $d_2/d_1$ | Local molded density ($g/cm^3$) | |
|---|---|---|---|---|---|---|
| | | Skin $r_1$ | Core $r_2$ | | Skin $d_1$ | Core $d_2$ |
| 22 | 0.24 | 0.08 | 0.34 | 0.56 | 0.34 | 0.19 |
| 23 | 0.20 | 0.09 | 0.44 | 0.51 | 0.35 | 0.18 |
| 24 | 0.16 | 0.10 | 0.61 | 0.47 | 0.36 | 0.17 |
| 25 | 0.25 | 0.14 | 0.57 | 0.51 | 0.35 | 0.18 |
| 26 | 0.33 | 0.18 | 0.55 | 0.54 | 0.35 | 0.19 |
| 27 | 0.15 | 0.08 | 0.53 | 0.52 | 0.42 | 0.22 |
| 28 | 0.13 | 0.07 | 0.56 | 0.43 | 0.46 | 0.20 |
| 29 | 0.075 | 0.03 | 0.40 | 0.69 | 0.62 | 0.43 |

INDUSTRIAL APPLICABILITY

According to the present invention, even when the water amount is increased in order to reduce the molded density in the preparation of a urethane foam, a polyurethane foam with a good moldability can be obtained with the maintaining of a high split tear strength.

What is claimed is:

1. A urethane foam for shoe soles prepared by a process comprising reacting a compound having at least two isocyanate-reactive hydrogen atoms and a molecular weight of 400 to 10000 with a polyisocyanate in the presence of a foam stabilizer, water and a catalyst, wherein a ratio $r_1/r_2$ of a mean skin cell diameter $r_1$ to a mean core cell diameter $r_2$ is 0.02 to 0.80, wherein the mean skin cell diameter $r_1$ is defined as the mean diameter of the cells which form the skin portion of a urethane foam extending from the surface to a depth of 5% of the foam thickness and the mean core cell diameter $r_2$ is defined as the mean diameter of the cells which form the core portion of a urethane foam extending from a depth of 40% to a depth of 60% of the foam thickness.

2. The urethane foam for shoe soles according to claim 1, wherein the ratio $r_1/r_2$ of the mean skin cell diameter $r_1$ to the mean core cell diameter $r_2$ is 0.02 to 0.40.

3. The urethane foam for shoe soles according to claim 2, wherein the mean skin cell diameter $r_1$ is not more than 0.20 mm and the mean core cell diameter $r_2$ is 0.25 to 1.20 mm.

4. The urethane foam for shoe soles according to claim 2, wherein the ratio $d_2/d_1$ of a mean core foam density $d_2$ to a mean skin foam density $d_1$ is 0.2 to 0.8, wherein the mean skin foam density $d_1$ is defined as the mean density of foam in the skin portion extending from the surface to a depth of 12% of the foam thickness, and the mean core foam density $d_2$ is defined as the mean density of foam in the core portion extending from a depth of 40% to a depth of 60% of the foam thickness.

5. The urethane foam for shoe soles according to claim 2 wherein the mean skin foam density $d_1$ is 0.20 to 0.80 $g/cm^3$ and the mean core foam density $d_2$ is 0.05 to 0.60 $g/cm^3$.

6. The urethane foam for shoe soles according to claim 2, wherein the overall molded density of the urethane foam is 0.15 to 0.50 $g/cm^3$.

7. The urethane foam for shoe soles according to claim 1, wherein the mean skin cell diameter $r_1$ is not more than 0.20 mm and the mean core cell diameter $r_2$ is 0.25 to 1.20 mm.

8. The urethane foam for shoe soles according to claim 7, wherein the ratio $d_2/d_1$ of a mean core foam density $d_2$ to a mean skin foam density $d_1$ is 0.2 to 0.8, wherein the mean skin foam density $d_1$ is defined as the mean density of foam in the skin portion extending from the surface to a depth of 12% of the foam thickness, and the mean core foam density $d_2$ is defined as the mean density of foam in the core portion extending from a depth of 40% to a depth of 60% of the foam thickness.

9. The urethane foam for shoe soles according to claim 7, wherein the mean skin foam density $d_1$ is 0.20 to 0.80 $g/cm^3$ and the mean core foam density $d_2$ is 0.05 to 0.60 $g/cm^3$.

10. The urethane foam for shoe soles according to claim 7, wherein the overall molded density of the urethane foam is 0.15 to 0.50 $g/cm^3$.

11. The urethane foam for shoe soles according to claim 1, wherein the ratio $d_2/d_1$ of a mean core foam density $d_2$ to a mean skin foam density $d_1$ is 0.2 to 0.8, wherein the mean skin foam density $d_1$ is defined as the mean density of foam in the skin portion extending from the surface to a depth of 12% of the foam thickness, and the mean core foam density $d_2$ is defined as the mean density of foam in the core portion extending from a depth of 40% to a depth of 60% of the foam thickness.

12. The urethane foam for shoe soles according to claim 11, wherein the mean skin foam density $d_1$ is 0.20 to 0.80 $g/cm^3$ and the mean core foam density $d_2$ is 0.05 to 0.60 $g/cm^3$.

13. The urethane foam for shoe soles according to claim 11, wherein the overall molded density of the urethane foam is 0.15 to 0.50 $g/cm^3$.

14. The urethane foam for shoe soles according to claim 1, wherein the mean skin foam density $d_1$ is 0.20 to 0.80 $g/cm^3$ and the mean core foam density $d_2$ is 0.05 to 0.60 $g/cm^3$.

15. The urethane foam for shoe soles according to claim 14, wherein the overall molded density of the urethane foam is 0.15 to 0.50 $g/cm^3$.

16. The urethane foam for shoe soles according to claim 1, wherein the overall molded density of the urethane foam is 0.15 to 0.50 $g/cm^3$.

* * * * *